(12) United States Patent
Vasquez et al.

(10) Patent No.: US 11,240,200 B1
(45) Date of Patent: Feb. 1, 2022

(54) TIME-DEPENDENT NETWORK ADDRESSING

(71) Applicant: Amazon Technologies, Inc., Seattle, WA (US)

(72) Inventors: Jorge Peixoto Vasquez, Mercer Island, WA (US); Hardeep Singh Uppal, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 770 days.

(21) Appl. No.: 15/991,654

(22) Filed: May 29, 2018

(51) Int. Cl.
  *H04L 29/12* (2006.01)
  *H04L 9/00* (2006.01)
  *H04L 29/06* (2006.01)
  *H04L 12/741* (2013.01)

(52) U.S. Cl.
  CPC .............. *H04L 61/35* (2013.01); *H04L 9/006* (2013.01); *H04L 45/74* (2013.01); *H04L 63/1441* (2013.01); *H04L 69/16* (2013.01); *H04L 69/22* (2013.01); *H04L 69/28* (2013.01)

(58) Field of Classification Search
  CPC ..... G06F 21/56; H04L 63/1441; H04L 61/35; H04L 9/006; H04L 45/74; H04L 69/16; H04L 69/22; H04L 69/28
  See application file for complete search history.

(56) References Cited

U.S. PATENT DOCUMENTS

| | | | | |
|---|---|---|---|---|
| 5,982,506 A | * | 11/1999 | Kara | G06Q 20/389 358/405 |
| 9,135,037 B1 | * | 9/2015 | Petrescu-Prahova | G06F 9/45558 |
| 9,619,662 B1 | * | 4/2017 | Beda, III | H04L 63/00 |
| 2005/0108576 A1 | * | 5/2005 | Munshi | H04L 63/0464 726/4 |
| 2010/0211787 A1 | * | 8/2010 | Bukshpun | H04L 9/065 713/170 |
| 2015/0326613 A1 | * | 11/2015 | Devarajan | H04L 61/2007 726/1 |
| 2016/0269294 A1 | * | 9/2016 | Rankin | H04L 47/193 |

* cited by examiner

*Primary Examiner* — Azizul Choudhury
(74) *Attorney, Agent, or Firm* — Thomas Horstemeyer, LLP

(57) ABSTRACT

Disclosed are various embodiments for time based network addresses. A network packet is received over a network by a first computing device from a second computing device. The network packet contains a time-dependent destination address for a third computing device, such as a time-dependent internet protocol version 6 (IPv6) address. The time-dependent destination address contains a time-dependent checksum based at least in part on a current time and an encryption key associated with the third computing device. The checksum is validated upon receipt. In response to a determination that the checksum is valid, the network packet is forwarded to the third computing device.

20 Claims, 5 Drawing Sheets

TIME-DEPENDENT NETWORK ADDRESSING

BACKGROUND

Network addresses are often associated with a device for an extended period of time. For example, once a network address is assigned to a device, the device may keep the network address for as long as the device is connected to the network. This can simplify network administration. However, once a network address is discovered by a malicious actor, the computing device to which the network address is assigned may continue to be attacked by the malicious actor indefinitely. For example, the malicious actor may launch a denial of service (DoS) or distributed denial of service (DDoS) attack destined for the network address and to which the network address is assigned.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various embodiments for time-dependent network addressing. Checksums that are derived from the current time or time period are inserted into unused portions of a network address, such as an address that complies with internet protocol version 6 (IPv6). For example, while an IPv6 address provides for 128 bits for addressing individual network interfaces or computing devices, many of these bits are set to zero as the number of computing devices inexistence is far less than $2^{128}$. Accordingly, the unused bits of an IPv6 address could be repurposed to encode a time-based value, such as a checksum. If a packet has a valid time-based checksum within its IPv6 address, the packet can be forwarded on to its intended destination as represented by the remaining portion of the IPv6 address. In contrast, if a packet lacks a time-based checksum within its IPv6 address, or includes an invalid time-based checksum (e.g., an expired checksum or a checksum computed using the wrong credentials), the packet can be dropped or otherwise discarded. For instance, packets from unauthorized devices (e.g., personal devices on a corporate network) or from unauthorized applications (e.g., viruses, Trojans, worms, botnets, or other malicious applications) could be quickly and easily identified due to the lack of a time-based checksum or the presence of an invalid time-based checksum. In the following discussion, a general description of the system and its components is provided, followed by a discussion of the operation of the same. Although the principles of the present disclosure are described using the example of an IPv6 address, the illustrated principles may be used with other types of network addresses (e.g., link-layer addresses, future versions of the internet protocol, etc.).

Figure 1:
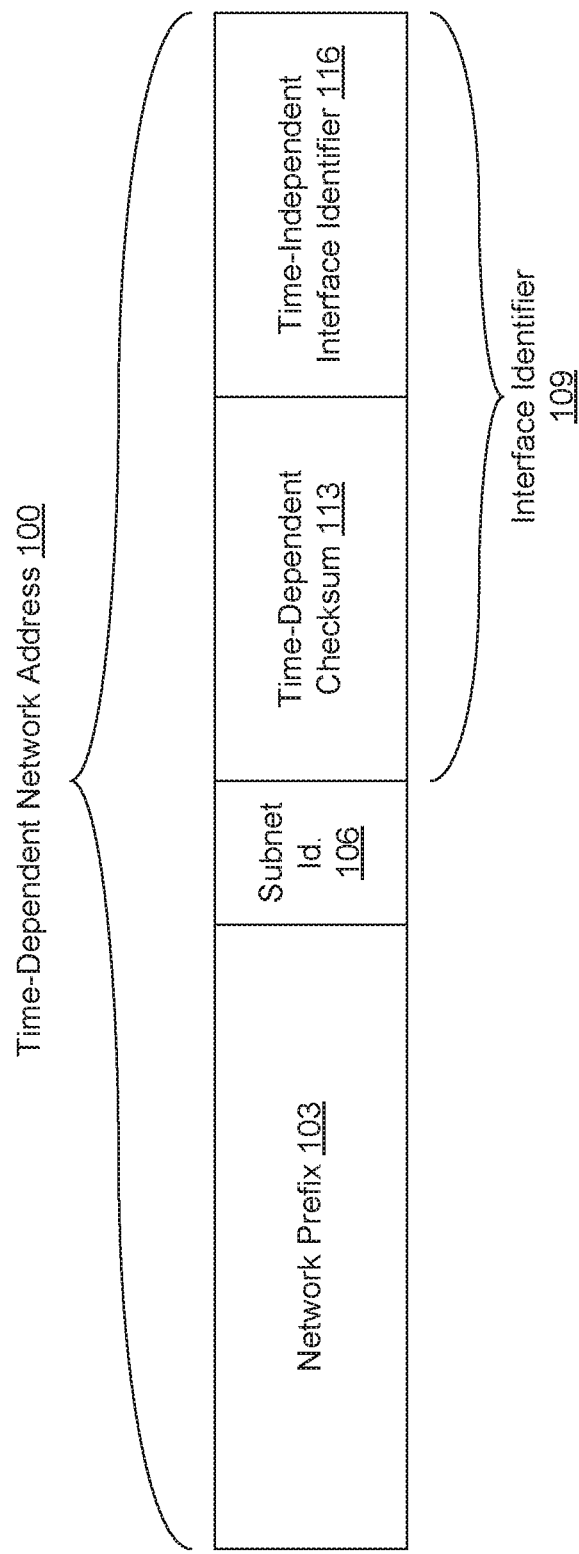
FIG. 1 is a drawing depicting one of several embodiments of the present disclosure.

FIG. 1 illustrates an example of a time-dependent network address 100. Here, the time-dependent network address 100 depicted is a modified version of an internet protocol version 6 (IPv6) address used for IPv6 packets and network traffic according to various embodiments of the present disclosure. The time-dependent network address 100 has several components. The first component is a network prefix 103, which may be between 48 and 64 bits in length. The second component is a subnet identifier 106, which may be between 0 and 16 bits in length. The third component is an interface identifier 109, which is 64 bits in length.

The combination of the network prefix 103 and the subnet identifier 106 will equal 64 bits. For example, a home network may have a 64-bit network prefix 103 and no subnet identifier 106. As another example, an enterprise network may have 50-bit network prefix 103 and a 14-bit subnet identifier 106, allowing for $2^{14}$ uniquely addressable subnets for the enterprise.

In a typical IPv6 address, the entire interface identifier 109 is used to uniquely identify a network interface of a computing device. However, as a 64-bit interface identifier 109 allows for $2^{64}$ (18,446,744,073,709,551,516) unique addresses within a subnet, many of the bits of the interface identifier 109 are unused and set to the number zero (0). For example, a computing device with the interface identifier 109 for its IPv6 address set to the number five (5) would require 3 bits of the 64 bit interface identifier 109. As another example, a computing device with the interface identifier 109 for its IPv6 address set to the number four billion, five hundred and sixty thousand, and one (4,000,560,001) would only require thirty-two (32) bits of the interface identifier 109. The unused bits are set to a value of zero.

In various embodiments of the present disclosure, the interface identifier 109 may be split into two segments. The first segment is used for a time-dependent checksum 113. The second segment is used for a time-independent interface identifier 116. The number of bits allocated for the time-dependent checksum 113 and the time-independent interface identifier 116 may be allocated as desired for a particular implementation. However, the length of the time-dependent checksum 113 and the time-independent interface identifier 116 will together equal 64 bits in order for the interface identifier 109 to also be recognized as a standards compliant IPv6 interface identifier 109.

Figure 2:
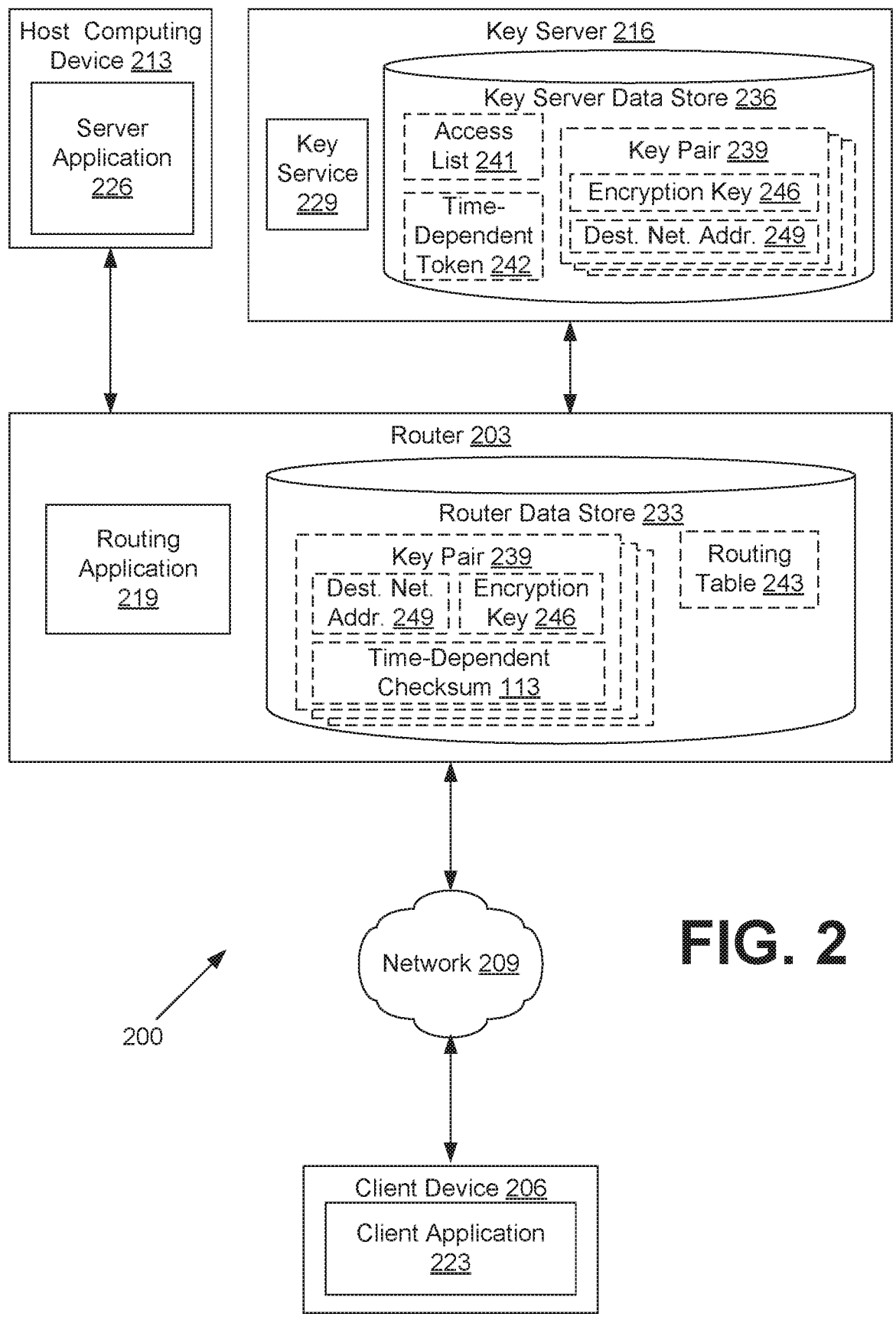
FIG. 2 is a drawing of a networked environment according to various embodiments of the present disclosure.

With reference to FIG. 2, shown is a networked environment 200 according to various embodiments. The networked environment 200 includes a router 203 and a client device 206, which are in data communication with each other via a network 209. The network 209 includes wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 209 can also include a combination of two or more networks 209. Examples of networks 209 can include the Internet, intranets, extranets, virtual private networks (VPNs), and similar networks.

One or more computing devices may also be in data communication with the router 203. For example, a host computing device 213 and a key server 216 may be in data communication with the router 203. In some embodiments, the host computing device 213 and the key server 216 may be directly connected to the router 203. In other embodiments, either or both of the host computing device 213 and the key server 216 may be in data communication with the router 203 through the network 209.

In some implementations, one or more of the router 203, the client device 206, the host computing device 213, or the key server 216 can be provisioned as virtual machines executing on one or more computing devices in a computing environment. In these implementations, the computing environment may employ a plurality of computing devices that may be arranged, for example, in one or more server banks or computer banks or other arrangements. Such computing devices may be located in a single installation or may be distributed among many different geographical locations. For example, the computing environment may include a plurality of computing devices that together may include a hosted computing resource, a grid computing resource or any other distributed computing arrangement. In some cases, the computing environment may correspond to an elastic computing resource where the allotted capacity for processing, network, storage, or other computing-related resource may vary over time.

Various applications or other functionality may be executed by the router 203, the client device 206, the host computing device 213, and the key server 216, according to various embodiments. For example, the components executed on the router 203 can include a routing application 219, as well as other applications, services, processes, systems, engines, or functionality not discussed in detail herein. As another example, the components executed on the client device 206 can include a client application 223, as well as other applications, services, processes, systems, engines, or functionality not discussed in detail herein. Further, the components executed host computing device 213 can include a server application 226, as well as other applications, services, processes, systems, engines, or functionality not discussed in detail herein. In addition, the components executed on the key server 216 can include a key service 229, as well as other applications, services, processes, systems, engines, or functionality not discussed in detail herein.

Also, various data is stored in one or more data stores that are accessible to the components of the networking environment 200. Each data store may be representative of a plurality of data stores, which can include relational databases, object-oriented databases, hierarchical databases, hash tables or similar key-value data stores, as well as other data storage applications or data structures. The data stored in any of the data stores is associated with the operation of the various applications or functional entities described below. For example, a router data store 233 and a key server data store 236 may be stored on the router 203 and the key server 216, respectively.

Various types of data can be stored in the data stores. For example, a key pair 239 may be stored in the key server data store 236 and cached, in some embodiments, in the router data store 233. In some of these embodiments, the time-dependent checksum 113 (FIG. 1) for a time-independent destination network address 249 may be pre-computed and cached with the key pair 239 in the router data store 233. An access list 241 may also be stored in the key server data store 236. In some embodiments, a time-dependent token 242 may also be stored in the key server data store 236. A routing table 243 may also be stored in the router data store 233.

Each key pair 239 represents an association of an encryption key 246 with a time-independent destination network address 249. The encryption key 246 may be either a symmetric encryption key or a public key from an asymmetric key pair generated by or on behalf of a computing device located at the time-independent destination network address 249, according to various embodiments of the present disclosure. Examples of time-independent destination network addresses 249 include IPv6 addresses, internet protocol version 4 (IPv4) addresses, link-layer addresses, and other types of addresses used at various layers of the Open Systems Interconnection (OSI) model. For example, in contrast to a time-dependent network address 100 (FIG. 1), a time-independent destination network address 249 is "time-independent" because it lacks a time-dependent checksum 113.

In some embodiments, the time-dependent checksum 113 may be precomputed and cached with the key pair 239 in the router data store 233. This can allow for the routing application 219 to quickly determine the destination network address 249 for a packet with a given time-dependent checksum 113 compared to calculating the time-dependent checksum 113 for each packet as it is received. The routing application 219 may precompute the time-dependent checksums 113 itself, or this task may be performed by another application in various embodiments of the present disclosure.

In some of those embodiments, the precomputed time-dependent checksum 113 may be stored or cached for a predefined period of time. For example, the precomputed time-dependent checksum 113 may be cached for an amount of time equal to a time-to-live (TTL) value specified for a Domain Name System (DNS) entry corresponding to the time-independent destination network address 249. The access list 241 represents a list of computing devices and applications that are allowed to retrieve an encryption key 246 from a key pair 239 for a given time-independent destination network address 249. For example, a host computing device 213, a server application 226, a client device 206, or a client application 223 may be allowed to use time-dependent addressing to send network packets to some devices or applications, but not others. For example, a client device 206 provisioned for an employee may be allowed to communicate with host computing devices 213 hosting server applications 226 for the employee's department, but be prohibited from using the client device 206 to communication with other host computing devices 213 hosting server applications 226 for another department. Accordingly, an access list 241 may specify that the client device 206 is allowed to access or retrieve encryption keys 246 associated with time-independent destination IPv6 addresses of host computing devices 213 in the employee's department, but is prohibited from accessing encryption keys 246 associated with time-independent destination IPv6 addresses of host computing devices 213 that are outside of the employee's department.

The time-dependent token 242 may be used in some embodiments to generate and validate the time-dependent checksum 113. The time-dependent token 242 can be any arbitrary data value that is randomly generated at periodic intervals of time. For example, the key service 229 may periodically generate a new time-dependent token 242 at predefined intervals of time.

The routing table 243 that provides the routes to particular destinations from the router 203 and, in some instances, the topology of the network immediately around the router 203. For example, the routing table 243 may, for all reachable destinations, the time-independent destination network address 249 of a destination and the next device along the path to that destination, which is sometimes referred to as the next "hop."

The router 203 is representative of one or more computing devices that are capable of routing and forwarding network traffic, including network packets. In some embodiments, the router 203 may be a general-purpose computing device, such as a server, that has been configured to route and forward network traffic sent to or received from the network 209. In these embodiments, the router 203 may be implemented as an operating system and applications executed directly by a computing device or executed as a virtual machine managed by a hypervisor and hosted in a computing environment. In some embodiments, the router 203 may be implemented using dedicated computing hardware making use of application specific integrated circuits (ASICs) specifically optimized for routing and forwarding network traffic.

The routing application 219 is executed to route network packets received by the router 203 to the destination identified in the network packets. Accordingly, in some embodiments, the routing application 219 may select a path to the destination for network packets received by the router 203. In some instances, the routing application 219 may provide for packet forwarding, whereby the routing application 219 decides the network interface of the router 203 from which a packet received by the router 203 should be retransmitted.

The client device 206 is representative of one or more client computer systems that may be coupled to the network 209. Such a computer system may be embodied in the form of a server computer, a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 206 may include one or more displays, such as liquid crystal displays (LCDs), gas plasma-based flat panel displays, organic light emitting diode (OLED) displays, electrophoretic ink ("E-ink") displays, projectors, or other types of display devices.

The client device 206 may be configured to execute various applications such as a client application 223 or other applications. The client application 223 may be executed in a client device 206, for example, to access network content served up by the host computing device 213 or other servers through the server application 226, thereby rendering a user interface on the display. To this end, the client application 223 may include, for example, a browser, a dedicated application, or other executable and the user interface may include a network page, an application screen, or other user mechanism for obtaining user input. The client device 206 may be configured to execute applications beyond the client application 223 such as, for example, email applications, social networking applications, word processors, spreadsheets, or other applications.

The host computing device 213 is representative of a computing device that is an intended destination for network traffic generated by the client device 206. For example, the host computing device 213 may represent a server or similar computing device that has been provisioned to host content that is requested by the client device 206. As another example, the host computing device 213 may represent a server or similar computing device that has been provisioned to execute an application in response to requests from an application executing on another computing device, such as an application executing on the client device 206. In some embodiments, the host computing device 213 may be implemented with a virtual machine, an elastic computing resource, grid computing resource, or similar virtualized instance of computational capability.

The server application 226 is executed to provide content to requesting applications or to perform one or more actions on behalf of a requesting application, such as a client application 223. The server application 226 may therefore include a hypertext transfer protocol (HTTP), file transfer protocol (FTP), or electronic mail (E-Mail) server that offers or provides content in response to a request. The server application 226 may also represent an application server that executes a query or performs a function in response to a request containing one or more parameters and returns a result, such as a database server, web application server, or similar service.

The key server 216 is representative of a computing device that has been provisioned to store cryptographic data and provide cryptographic data in response to requests from authorized applications or devices. In some embodiments, the key server 216 executes a key service 229 which stores encryption keys 246 in association with a time-independent destination network address 249 within a key pair 239. The key service will further provide the encryption key 246 to requesting applications that query the key service 229 for the encryption key 246 associated with a supplied time-independent destination network address 249.

Next, a general description of the operation of the various components of the networked environment 200 is provided. This general description is intended to illustrate the principles of the various embodiments of the present disclosure. A more detailed description of the operation of specific components is provided in FIGS. 3 and 4 of the present disclosure.

To begin, a host computing device 213 generates an encryption key 246 for use in generating and validating time-dependent checksums 113 (FIG. 1). The host computing device 213 may generate a symmetric encryption key 246 or an asymmetric key-pair that includes a publicly shared encryption key 246 and a corresponding private key. The time-dependent checksum 113 may be based on any type of data that changes at predictable and periodic intervals. For example, the time-dependent checksum 113 may be based on a current time or period of time. The time-dependent checksum 113 may also be based on a time-dependent token 242 that is refreshed or changed at periodic intervals.

The host computing device 213 then distributes the encryption key 246 to other computing devices in data communication with the host computing device 213. For example, the host computing device 213 may send the encryption key 246 and its time-independent destination IPv6 address to the key service 229 for storage and distribution to authorized computing devices (e.g., authorized routers 203 or client devices 206). Routers 203 or client devices 206 that need the encryption key 246 to generate a time-dependent network address 100 (FIG. 1) for packets to be sent to the host computing device 213 can request and obtain the encryption key 246 from the key service 229. In those embodiments, where the client application 223 is unaware of time-dependent checksums 113, no attempt will be made by the client application 223 to retrieve the encryption key 246.

Next, the client application 223 can attempt to send one or more IPV6 network packets to the server application 226 executing on the host computing device 213. Accordingly, the client application 223 obtains the encryption key 246 associated with the time-independent destination network address 249 of the host computing device 213. For example, the client application 223 may send the time-independent destination network address 249 and authentication credentials (e.g., a username and password, a certificate, a one-time password, or other credential) to the key service 229. In response, the key service 249 may evaluate the authentication credentials to determine that the client application 223 is authorized to receive the encryption key 246 and provide the encryption key 246 in response.

After receiving the encryption key 246, the client application 223 can generate the time-dependent checksum 113 for the network packet. First, the client application 223 can obtain the current time (e.g. from a synchronized time source such as a network time server that complies with a version of the network time protocol (NTP)) or the current time-dependent token 242. The client application 223 can then encrypt the current time or time-dependent token 242 using a previously agreed upon encryption algorithm to generate a time-dependent checksum 113. The client application 223 can then insert the time-dependent checksum 113 into the time-independent IPv6 destination address 249 to generate a time-dependent network address 100.

However, it should be noted that client devices 206 or client applications 223 that have not been configured to process time-dependent network addresses 100, or are not authorized to receive and use the encryption key 246 for a particular time-independent destination network address 249, will be unable to generate a time-dependent checksum 113 and, as a result, a time-dependent network address 100. For example, a malicious program such as a virus or botnet client attempting to attack the host computing devices 213 or server application 226 may be unaware of time-dependent network addresses 100 and therefore fail to convert a time-independent IPv6 destination address 249 into a time-dependent network address 100. As another example, a client application 223 and a client device 206 may be provided to employees of an enterprise. The employee may be allowed to access some host computing devices 213 or server applications 226, but may be prohibited from accessing other host computing devices 213 or server applications 226. Accordingly, the key service 229 may receive a valid request from the client application 223 for the encryption key 246 associated with a time-independent destination network address 249. However, the key service 229 may evaluate the access list 241 and determine that the client application 223 or the client device 206 that is executing the client application 223 is prohibited from accessing the encryption key 246 for the specified time-independent destination network address 249. In this example, the key service 229 may respond to the client application 223 with an error message indicating that the client application 223 is prohibited from receiving the encryption key 246.

If the client application 223 has received an encryption key 249, the client application 223 may send network packets with time-dependent network addresses 100 to the host computing device 213. Each of these network packets may traverse the network 209 and be processed by a routing application 219 executing on the router 203. The routing application 219 will then evaluate each network packet to determine whether the network packet is to be forwarded on to the host computing device 213.

For example, the routing application 219 may determine that a network packet lacks a time-dependent checksum 113. In such a situation, the routing application 219 may drop or discard the network packet. For example, network packets generated by malicious programs (e.g., viruses, botnets, etc.) may send network packets that do not contain a time-dependent checksum 113.

Likewise, the routing application 219 may determine whether a time-dependent checksum 113 is valid, as further described in this application. If the time-dependent checksum 113 is valid, the network packet will be forwarded on to its destination. If the time-dependent checksum 113 is invalid, however, then the network packet will be dropped or discarded.

For example, a network packet may be received containing a time-dependent checksum 113 that has expired. This can occur in a number of scenarios. For example, an attacker could be sending network packets to a time-dependent network address 100 for a host computing device 213 under the assumption that the time-dependent network address 100 is either a static address assignment or one that changes infrequently (e.g., an address assignment that might change upon a dynamic host configuration protocol (DHCP) lease renewal). Likewise, the attacker might be sending network packets to a time-dependent network address 100 without realizing that the time-dependent network address 100 includes a time-dependent checksum 113 that will change on a periodic basis, thereby changing the time-dependent network address 100 for the host computing device 213 on a periodic basis. Because these network packets would have an invalid time-dependent checksum 113 within the time dependent network address 100, the routing application 219 could quickly determine that the packets are not associated with permitted traffic and should be dropped or discarded.

Figure 3:
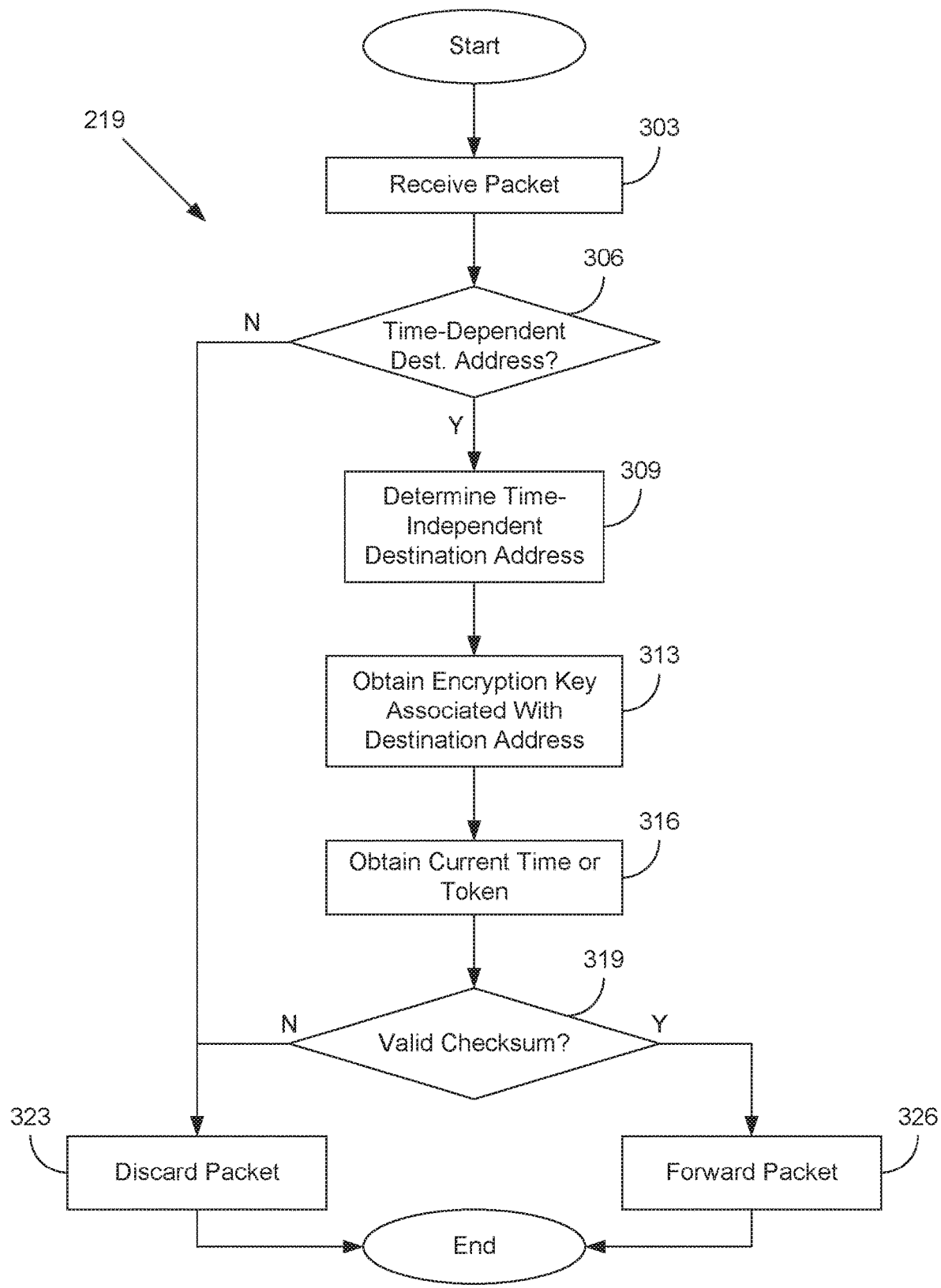
FIG. 3 is a flowchart illustrating one example of functionality implemented as portions of an application executed in the networked environment of FIG. 2 according to various embodiments of the present disclosure.

Referring next to FIG. 3, shown is a flowchart that provides one example of the operation of a portion of the routing application 219 according to various embodiments. It is understood that the flowchart of FIG. 3 provides merely an example of the many different types of functional arrangements that may be employed to implement the operation of the portion of the routing application 219 as described herein. As an alternative, the flowchart of FIG. 3 may be viewed as depicting an example of elements of a method implemented in the router 203 according to one or more embodiments. As another alternative, the flowchart of FIG. 3 may also be implemented by the operating system of the router 203 according to various embodiments of the present disclosure.

Beginning with box 303, the routing application 219 receives a network packet. For example, the routing application 219 could receive a network packet from the client application 223 executing on the client device 206. Likewise, the routing application 219 could receive a network packet from any other application executing on a computing device attached to the network 209 or otherwise in data communication with the router 203.

Moving on to box 306, the routing application 219 identifies a time-dependent network address 100 (FIG. 1) in the network packet. An IPv6 destination address may be recognized as time-dependent through various approaches. For example, the routing application 219 may determine whether a set of bits reserved for the time-dependent checksum 113 (FIG. 1) have a non-zero value. A non-zero value for the set of bits would indicate the presence of a time-dependent checksum 113, while a value of zero would indicate that the IPv6 address is time-independent. If the routing application 219 determines that the IPv6 is not a time-dependent IPv6 destination address, then the routing application 219 skips to box 323. Otherwise, the routing application 219 continues to box 309.

Proceeding next to box 309, the routing application 219 parses the time-dependent network address 100 to determine the time-independent destination network address 249 (FIG. 2) from the time-dependent network address 100. For example, the routing application could read all of the bits of the time-dependent network address 100 other than those used for the time-dependent checksum 113 in order to determine the time-independent destination network address 249. As another example, the routing application 219 may set to zero the bits assigned to the time-dependent checksum 113 to convert the time-dependent network address 100 into a time-independent destination network address 249 that reflects the routable or reachable IPv6 address for the final destination of the network packet. The time-independent destination network address 249 may be cached by the routing application 219 for later use.

Referring to box 313, the routing application 219 obtains an encryption key 246 (FIG. 2) associated with the time-independent destination network address 249. For example, the routing application 219 may have previously cached an encryption key 246 in a router data store 233 when processing a previous packet destined for the time-independent destination network address 249. In this example, the routing application 219 may retrieve the encryption key 246 by searching for the key pair 239 (FIG. 2) with the corresponding time-independent destination network address 249. As another example, the routing application 219 can send a query to the key service 229 and receive the encryption key 246 in response. In this example, the query could include the time-independent destination network address 249 as an argument to be supplied to the key service 229 for searching for the appropriate key pair 239 stored in the key server data store 236.

Moving on to box 316, the routing application 219 can obtain the current time or a current time-dependent token 242. For example, the routing application 219 may send a query to a network time service executing on a computing device in data communication with the router 203 using a version of the network time protocol. As another example, the routing application 219 can query the system clock of the router 203 to determine the current time. For implementations that use a time-dependent token 242 that changes at periodic intervals, the routing application 219 can request the current time-dependent token 242 from an authoritative service such as the key service 229 or the routing application 219 can retrieve a cached copy of the time-dependent token 242 from the router data store 233.

In some embodiments, routing application 219 may request a value for the current time that is less precise than what the network time service or the system clock is capable of providing. For example, the system clock or network time service may be able to provide time accurate to with a thousandth ($1/1000$) or even ten-thousandths ($1/10,000$) of a second. However, the routing application 219 may only request a time that is accurate to the current minute, half-minute, or other increment. In other embodiments, the routing application 219 may instead ignore significant digits of precision that are more accurate than what is desired or requested. For example, if the routing application 219 only requires precision to the current minute, the routing application 219 may ignore the portion of the current time that identifies the current second or fraction of a second.

Proceeding to box 319, the routing application 219 validates the time-dependent checksum 113. To validate the time-dependent checksum 113, the routing application 219 can encrypt the value of the current time with the encryption key 246 obtained at box 313 and compares the value of the encrypted current time to the value of the time-dependent checksum 113. In another implementation, the routing application 219 can encrypt the time-dependent token 242 with the encryption key 246 obtained at box 313 and compare the value of the encrypted time-dependent token 242 to the value of the time-dependent checksum 113. If the two values match, then the time-dependent checksum 113 is determined to be valid. If the two values do not match, the routing application 219 further encrypts the value for the prior time interval with the encryption key 246 obtained at box 313 and compares that value to the value of the time-dependent checksum 113. For example, if the current time is 5:02 p.m. Greenwich Mean Time (GMT) (seconds ignored), then the routing application 219 may encrypt the value for the previous time interval (5:01 p.m. GMT) and compare that value to the time-dependent checksum 113. If the value computed using the previous time interval matches the time-dependent checksum 113, then the time-dependent checksum 113 is determined to be valid. The additional calculation is made to account for the edge case where the network packet was generated on one side of a boundary of a time interval, but received on the other side of the boundary of the time interval. Any symmetric or asymmetric encryption algorithm may be used, according to particular implementation requirements.

If the time-dependent checksum 113 is determined to be invalid, then the routing application 219 proceeds to box 323. Here, the network packet containing the incorrect time-dependent checksum 113 is discarded. Processing of the network packet by the routing application 219 then ends.

However, if the time-dependent checksum 112 is determined to be valid, then the routing application 219 proceeds to box 326. Here, the network packet is forwarded to the time-independent destination network address 249 previously generated at box 309 or the next node in the route to the time-independent destination network address 249. In some instances, the network packet will be forwarded unmodified. In other instances, a new time-dependent checksum 113 may be generated by the routing application 219 and inserted into the time-dependent network address 100 of the network packet to replace the current time-dependent checksum 113. This may be done to keep the time-dependent checksum 113 current so that further processing of the packet does not result in the packet being discarded as additional boundaries between periods of time are potentially crossed. Once the packet is forwarded, processing of the network packet by the routing application 219 ends.

Figure 4:
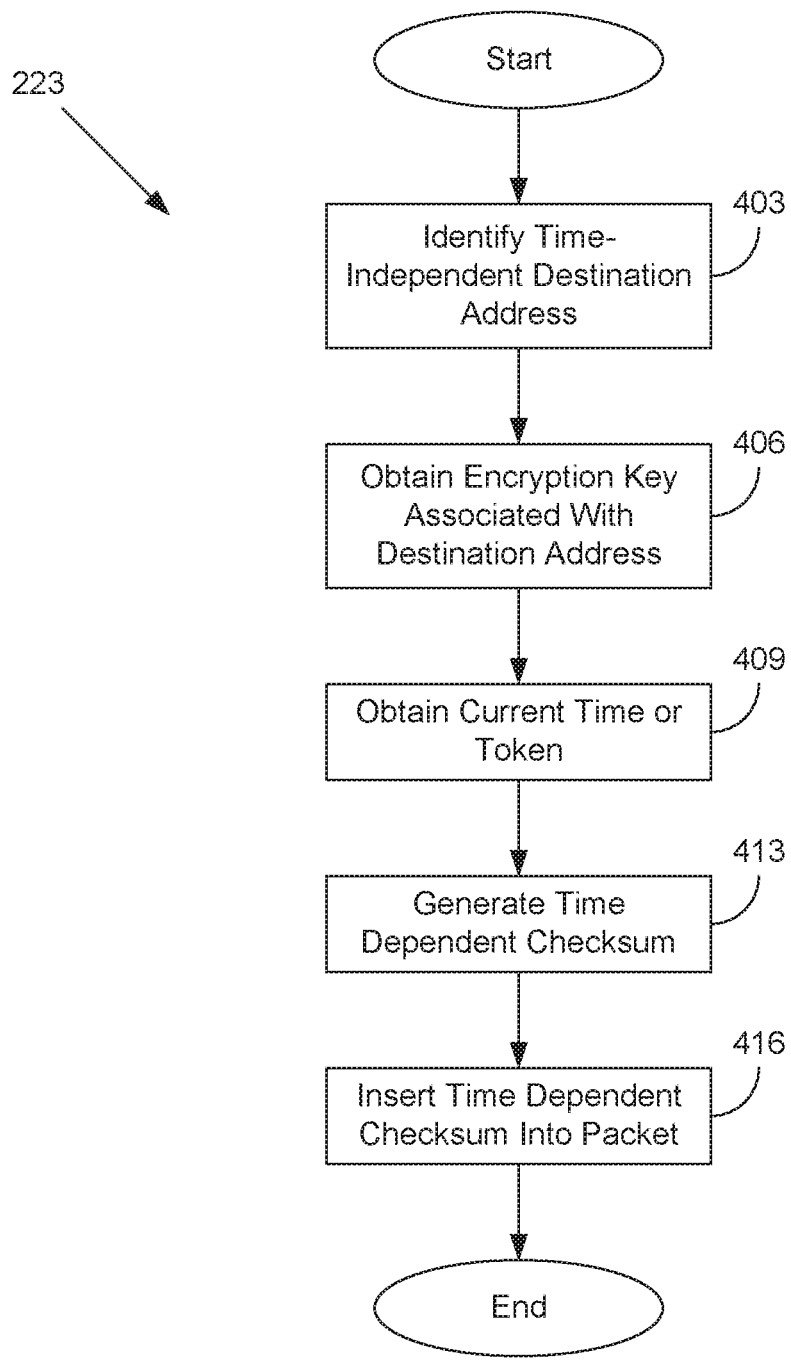
FIG. 4 is a flowchart illustrating one example of functionality implemented as portions of an application executed in the networked environment of FIG. 2 according to various embodiments of the present disclosure.

Referring next to FIG. 4, shown is a flowchart that provides one example of the operation of a portion of the client application 223 according to various embodiments. It is understood that the flowchart of FIG. 4 provides merely an example of the many different types of functional arrangements that may be employed to implement the operation of the portion of the client application 223 as described herein. As an alternative, the flowchart of FIG. 4 may be viewed as depicting an example of elements of a method implemented in the client device 206 according to one or more embodiments. As another alternative, the flowchart of FIG. 4 may also be implemented by the operating system of the client device 206 according to various embodiments of the present disclosure.

Beginning with box 403, the client application 223 identifies the time-independent destination network address 249 (FIG. 2) that a network packet is destined for. For example, the client application 223 may execute a domain name system (DNS) query for a hostname and receive an AAAA record in response specifying the time-independent destination network address 249 for the destination computing device. As another example, a user may manually input the time-independent destination network address 249.

Moving on to box 406, the client application 223 obtains an encryption key 246 (FIG. 2) associated with the time-independent destination network address 249. For example, the client application 223 can send a query to the key service 229. Once the key service 229 determines that the client application 223 is authorized to receive the encryption key 246, the client application 223 can receive the encryption key 246 in response. The query could include the time-independent destination network address 249 as an argument to be supplied to the key service 229 for searching for the appropriate key pair 239 stored in the key server data store 236.

Proceeding next to box 409, the client application 223 can obtain the current time. For example, the client application 223 may send a query to a network time service executing on a computing device in data communication with the client device 206 using a version of the network time protocol. As another example, the client application 223 can query the system clock of the client device 206 to determine the current time. For implementations that use a time-dependent token 242 that changes at periodic intervals, the client application 223 can request the current time-dependent token 242 from an authoritative service such as the key service 229 or the client application 223 can retrieve a locally cached copy of the time-dependent token 242 from the client's memory.

In some implementations, the client application 223 may request a value for the current time that is less precise than what the network time service or the system clock is capable of providing. For example, the system clock or network time service may be able to provide time accurate to with a thousandth ($1/1000$) or even ten-thousandths ($1/10,000$) of a second. However, the client application 223 may only request a time that is accurate to the current minute, half-minute, or other increment. In other embodiments, the client application 223 may instead ignore significant digits of precision that are more accurate than what is desired or requested. For example, if the client application 223 only requires precision to the current minute, the client application 223 may ignore the portion of the current time that identifies the current second or fraction of a second.

Referring next to box 413, the client application 223 generates the time-dependent checksum 113 for the network packet. The time-dependent checksum 113 is based at least in part on the encryption key 246 and the current time or the time-dependent token 242 obtained at box 409. For example, the client application 223 can encrypt the current time with the encryption key 246 to generate the time-dependent checksum 113. As another example, the client application 223 can encrypt the time-dependent token 242 with the encryption key 246 to generate the time-dependent checksum 113. Any symmetric or asymmetric encryption algorithm can be used as appropriate for the particular implementation. Likewise, the time-dependent checksum 113 can be of any length that fits within the interface identifier 109 (FIG. 1) of the time-dependent network address 100 and still fulfills the requirements of the particular implementation.

Moving on to box 416, the client application 223 inserts the time-dependent checksum 113 into the time-independent destination network address 249. For example, the client application 223 may insert the time-dependent checksum 113 into the most significant bits (e.g., the left-most bits in many computer architectures) of the interface identifier 109 of the time-independent destination network address 249 in order to maintain compatibility with other IPv6 routing and addressing systems. However, the client application 223 may insert the time-dependent checksum 113 into the least significant bits (e.g., the right-most bits in many computer architectures) of the interface identifier 109 of the time-independent destination network address 249.

Once the time-dependent checksum 113 is inserted into the interface identifier 109 of the time-independent destination network address 249 to create a time-dependent network address 100, the network packet is sent to its destination. Processing of the packet subsequently ends.

Figure 5:
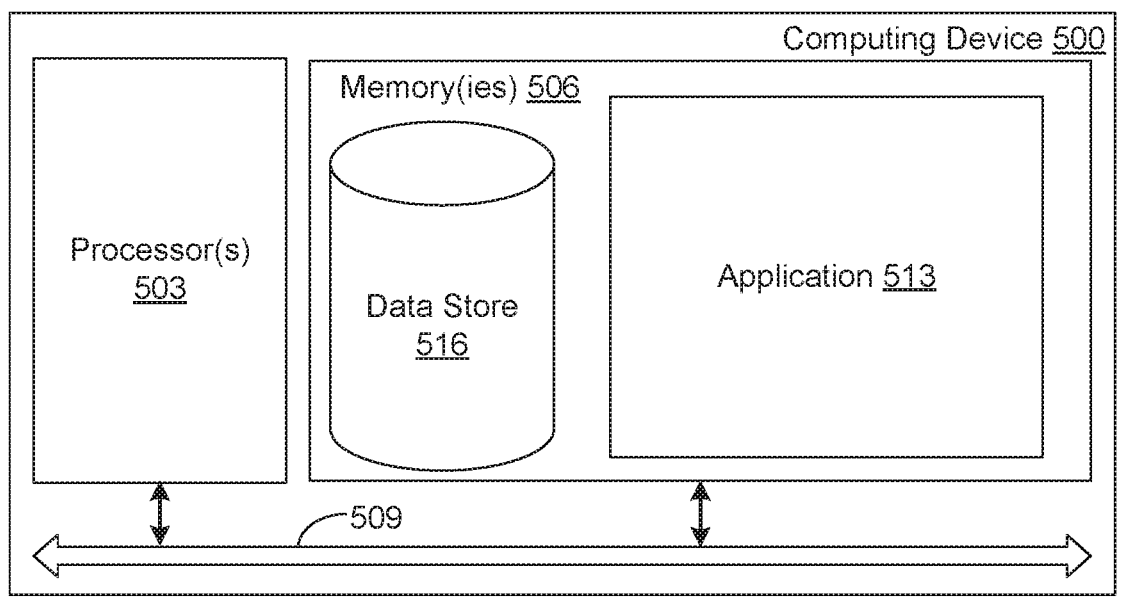
FIG. 5 is a schematic block diagram that provides one example illustration of a computing environment employed in the networked environment of FIG. 1 according to various embodiments of the present disclosure.

With reference to FIG. 5, shown is a schematic block diagram of a computing device 500, such as a router 203 (FIG. 2), a client device 206 (FIG. 2), a host computing device 213 (FIG. 2), or a key server 216 (FIG. 2). Each computing device 500 includes at least one processor circuit, for example, having a processor 503 and a memory 506, both of which are coupled to a local interface 509. To this end, each computing device 500 may include, for example, at least one server computer or like device. The local interface 509 may include, for example, a data bus with an accompanying address/control bus or other bus structure as can be appreciated.

Stored in the memory 506 are both data and several components that are executable by the processor 503. In particular, stored in the memory 506 and executable by the processor 503 are one or more applications 513 (e.g., a routing application 219, a client application 223, a server application 226, or a key service 229), and potentially other applications. Also stored in the memory 506 may be a data store 516 (e.g., a router data store 233 (FIG. 2) or a key server data store 236 (FIG. 2) and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

Also, the processor 503 may represent multiple processors 503 or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506. The local interface 509 may include additional systems designed to coordinate this communication, including, for example, performing load balancing. The processor 503 may be of electrical or of some other available construction.

Although the routing application 219, the client application 223, the server application 226, the key server 229, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the routing application 219 and the client application 223. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor 503 in a computer system or other system. The machine code may be converted from the source code through various processes. For example, the machine code may be generated from the source code with a compiler prior to execution of the corresponding application. As another example, the machine code may be generated from the source code concurrently with execution with an interpreter. Other approaches can also be used. If embodied in hardware, each block may represent a circuit or a number of interconnected circuits to implement the specified logical function or functions.

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the routing application 219, the client application 223, the server application 226, and the key server 229, that includes software or code can be embodied in any non-transitory computer-readable medium for use by or in connection with an instruction execution system such as, for example, a processor 503 in a computer system or other system. In this sense, the logic may include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the routing application 219, the client application 223, the server application 226, and the key server 229, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices in the same computing environment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
   a first computing device comprising a processor and a memory, the first computing device being in data communication over a network with a second computing device and a third computing device; and
   an application comprising machine readable instructions stored in the memory that, when executed by the processor, cause the first computing device to at least:
      receive a network packet over the network from the second computing device, the network packet containing a time-dependent destination address for the third computing device, the time-dependent destination address containing a time-dependent checksum based at least in part on a current time and an encryption key associated with the third computing device;
      validate the checksum for the network packet; and
      in response to a determination that the checksum is valid, forward the network packet to the third computing device.

2. The system of claim 1, wherein the machine readable instructions, when executed by the processor, cause the first computing device to at least discard the network packet in response to an alternative determination that the checksum is invalid.

3. The system of claim 1, wherein the time-dependent network address is an internet protocol version 6 (IPv6) address that includes a sixty-four (64) bit interface identifier, and a first portion of the sixty-four (64) bit interface identifier contains the time-dependent checksum and a second portion of the sixty-four (64) bit interface identifier represents an address for an interface of the third computing device connected to the network.

4. The system of claim 1, wherein the checksum is a first checksum and the machine readable instructions that, when executed by the processor, cause the first computing device to validate the checksum for the network packet further cause the first computing device to:
   obtain the current time;
   obtain the encryption key associated with the third computing device;
   compute a second checksum based at least in part on the current time and the encryption key associated with the third computing device; and
   compare the first checksum to the second checksum, wherein the first checksum is determined to be valid when the first checksum matches the second checksum.

5. The system of claim 1, wherein the machine readable instructions that cause the first computing device to forward the network packet to the third computing device further cause the first computing device to at least:
   parse the time-dependent destination address to determine a time-independent destination address; and
   forward the network packet to the third computing device based at least in part on the time-independent destination address.

6. The system of claim 1, wherein the encryption key is a symmetric encryption key.

7. The system of claim 1, wherein the encryption key is an asymmetric encryption key.

8. A computer-implemented method, comprising:
   receiving a network packet complying with internet protocol version six (IPv6);
   identifying a destination IPv6 address of the network packet;
   identifying an interface identifier of the destination IPv6 address;
   identifying a time-dependent checksum for the destination IPv6 address embedded within the interface identifier; and
   determining that the time-dependent checksum is valid.

9. The computer-implemented method of claim 8, further comprising forwarding the network packet to a next hop in a route in response to determining that the time-dependent checksum is valid.

10. The computer-implemented method of claim 9, wherein forwarding the network packet to the next hop in the route in response to determining that the time-dependent checksum is valid further comprises:
    omitting the time-dependent checksum in the destination IPv6 address to generate a routable IPv6 address; and
    consulting a routing table to determine the next hop for the routable IPv6 address.

11. The computer-implemented method of claim 8, wherein the time-dependent checksum is a first time-dependent checksum and determining that the time-dependent checksum is valid further comprises:
    calculating a second time-dependent checksum for the destination IPv6 address; and
    determining that the first time-dependent checksum matches the second time-dependent checksum.

12. The computer-implemented method of claim 8, wherein identifying the time-dependent checksum for the destination IPv6 address embedded within the interface identifier further comprises locating a predefined number of bits at a predefined position within the interface identifier of the destination IPv6 address.

13. The method of claim 8, wherein the time-dependent checksum is based at least in part on a time at which the network packet was sent and an encryption key.

14. The method of claim 13, wherein the encryption key is a previously shared symmetrical encryption key.

15. The method of claim 13, wherein the encryption key is a public key linked to a destination for the network packet.

16. A non-transitory, computer-readable medium comprising machine-readable instructions that, when executed by a processor of a first computing device, cause the first computing device to at least:
   receive a network packet over the network from the second computing device, the network packet containing a time-dependent destination address for the third computing device, the time-dependent destination address containing a time-dependent checksum based at least in part on a current time and an encryption key associated with the third computing device;

validate the checksum for the network packet; and in response to a determination that the checksum is valid, forward the network packet to the third computing device.

17. The non-transitory, computer-readable medium of claim 16, wherein the machine readable instructions, when executed by the processor, further cause the first computing device to at least discard the network packet in response to an alternative determination that the checksum is invalid.

18. The non-transitory, computer-readable medium of claim 16, wherein the checksum is a first checksum and the machine readable instructions that, when executed by the processor, cause the first computing device to validate the checksum for the network packet further cause the first computing device to:

obtain the current time;

obtain the encryption key associated with the third computing device;

compute a second checksum based at least in part on the current time and the encryption key associated with the third computing device; and compare the first checksum to the second checksum, wherein the first checksum is determined to be valid when the first checksum matches the second checksum.

19. The non-transitory, computer-readable medium of claim 16, wherein the machine readable instructions that cause the first computing device to forward the network packet to the third computing device further cause the first computing device to at least:

parse the time-dependent destination address to determine a time-independent destination address; and forward the network packet to the third computing device based at least in part on the time-independent destination address.

20. The non-transitory, computer-readable medium of claim 16, wherein the time-dependent network address is an internet protocol version 6 (IPv6) address that includes a sixty-four (64) bit interface identifier, and a first portion of the sixty-four (64) bit interface identifier contains the time-dependent checksum and a second portion of the sixty-four (64) bit interface identifier represents an address for an interface of the third computing device connected to the network.

* * * * *